United States Patent [19]

Cleasby

[11] Patent Number: 4,838,298

[45] Date of Patent: Jun. 13, 1989

[54] HYDRAULIC LATCH DEVICE

[75] Inventor: Kenneth G. Cleasby, Chichester, England

[73] Assignee: Vickers Systems Limited, Havant, England

[21] Appl. No.: 208,141

[22] Filed: Jun. 16, 1988

[30] Foreign Application Priority Data

Jun. 20, 1987 [GB] United Kingdom ................. 8714519

[51] Int. Cl.[4] ............................................ G05D 16/00

[52] U.S. Cl. .................................. 137/110; 137/116.3

[58] Field of Search ............. 137/109, 110, 102, 116.3

[56] References Cited

U.S. PATENT DOCUMENTS 3,357,359 12/1967 Schaub ............................ 137/110 X 3,375,845 4/1968 Behm .................................. 137/110

4,561,458 12/1985 Hoffmann ....................... 137/110 X

*Primary Examiner*—Alan Cohan

*Attorney, Agent, or Firm*—Barnes, Kisselle, Raisch, Choate, Whittemore & Hulbert

[57] ABSTRACT

An hydraulic latch device comprises a housing having an inlet (14) for hydraulic fluid, an outlet (17) for hydraulic fluid, and first and second spool means (63,67; 62) slidably mounted in the housing and operable to control the flow of hydraulic fluid from the inlet to the outlet, each of the first and second spool means having resilient means (68;69) associated therewith and being operable to bias the spool means in one direction of sliding movement, the resilient means being arranged such that that associated with the first spool means determines the inlet pressure which places the device in a latched mode in which a first relationship is established between the inlet and outlet, and the resilient means associated with the second spool means determines the inlet pressure at which the device is placed in the unlatched mode in which mode a second relationship is established between the inlet and the outlet, with the latch pressure being higher than the unlatched pressure, and means provided to assist in maintaining the device in the latch mode by way of the first spool means (63,67) being stepped so as to provide first and second surfaces against which the inlet pressure can act, the effective surface area to which the inlet pressure is applied in the latched mode being greater than that to which the inlet pressure is applied in the unlatched mode.

13 Claims, 5 Drawing Sheets

Fig. 1
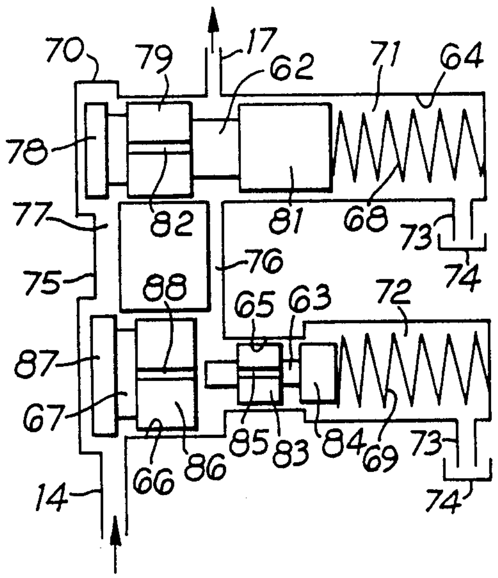
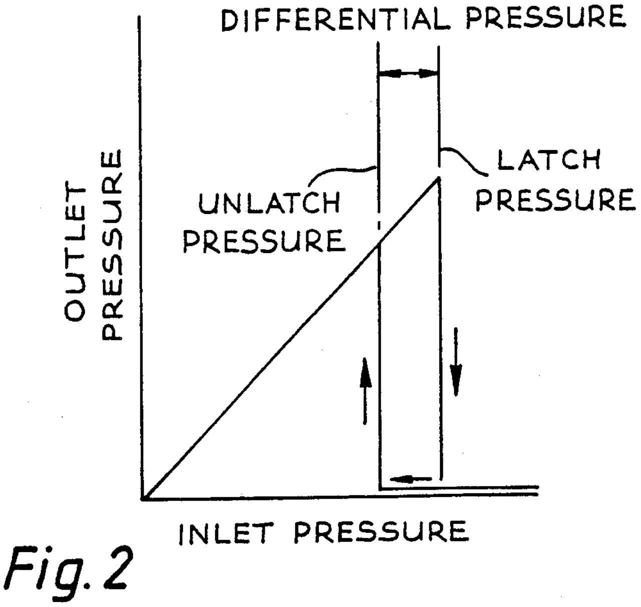
Fig. 2

HYDRAULIC LATCH DEVICE

BACKGROUND OF THE INVENTION

1. Field of the Invention

This invention relates to an hydraulic latch device.

SUMMARY OF THE INVENTION

According to the present invention, there is provided an hydraulic latch device comprising an hydraulic latch device comprising a housing having an inlet for hydraulic fluid, an outlet for hydraulic fluid, and first and second spool means slidably mounted in the housing and operable to control the flow of hydraulic fluid from the inlet to the outlet, each of the first and second spool means having resilient means associated therewith and being operable to bias the spool means in one direction of sliding movement, the resilient means being such that that associated with the first spool means determines the inlet pressure which places the device in a latched mode in which a first relationship is established between the inlet and outlet, and the resilient means associated with the second spool means determines the inlet pressure at which the device is placed in the unlatched mode in which mode a second relationship is established between the inlet and the outlet, with the latch pressure being higher than the unlatched pressure, and means provided to assist in maintaining the device in the latch mode by way of the first spool means being stepped so as to provide first and second surfaces as against which the inlet pressure can act, the effective surface area to which the inlet pressure is applied in the latched mode being greater than that to which the inlet pressure is applied in the unlatched mode.

The present invention thus provides an hydraulic latch device with "hysteresis" in the sense that the inlet pressure required to place the device in the latch mode is higher than that required to place the device in the unlatch mode. The differential between the latch and unlatch inlet pressures is determined by the resilient means associated with the first and second spools. An important advantage of the present invention is that the hysteresis effect can be varied according to requirements merely be changing one or both of the resilient means which conveniently are in the form of compression springs.

The first relationship between the inlet and outlet may be a connection therebetween, and the second relationship may be a disconnection therebetween, or vice versa.

The first and second spool means may be arranged to slide along a common axis or along different axes and may each be provided with sealing means to prevent leakage from the inlet when the device is in the latched mode. The first and second spool means may also be provided with at least one metering notch to reduce hydraulic shocks when the device is switched to and from the latched mode. Means may be provided for damping the sliding movement of the first spool means and the first spool means and/or the second spool means may be a single or composite spool.

The first spool means may be provided with a land operable in a sealing position to separate the first and second surfaces such that the inlet pressure acts on only one of said surfaces. The first and/or second surface may be a composite surface provided by an algebraic summation of two or more surfaces, i.e. it may be the difference between two surface areas or the summation of two surface areas.

BRIEF DESCRIPTION OF THE DRAWINGS

Hydraulic latch devices in accordance with the present invention will now be described in greater detail, by way of example, with reference to the accompanying drawings, in which:

FIG. 1 is a diagrammatic view of one embodiment of the invention,

FIG. 2 is a graph illustrating the operation of the embodiment of FIG. 1.

DESCRIPTION OF PREFERRED EMBODIMENTS

Figure 3:
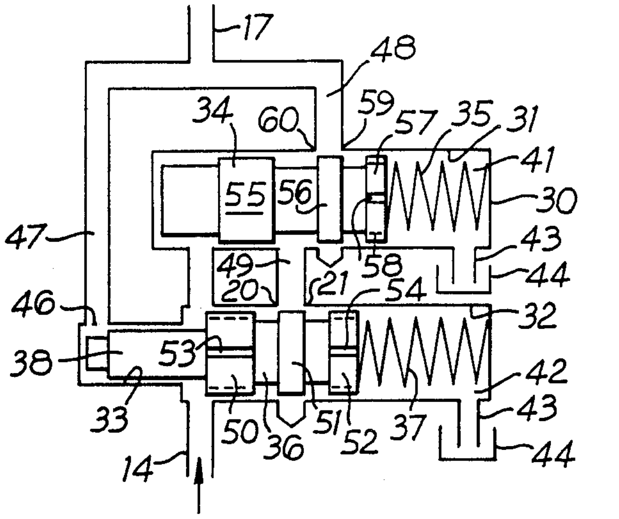
FIG. 3 is a diagrammatic view of a further embodiment.

Referring first to FIG. 1, this discloses one embodiment of the present invention in which the hydraulic latch device comprises a housing 70 having two spools 62 and 63 slidably mounted in respective bores 64 and 65 in the housing, with the bore 65 having a counterbore 66 in which a further spool 67 is slidably mounted of a diameter greater than that of the spool 63. The spools 63 and 67 constitute first spool means and may be provided as one spool or as two separate spools (as shown) without loss of function. One advantage of employing two separate spools from an operational point of view is that the device performs a relief or pressure limiting function for the pressure at the outlet port 17. This is because the spool 63 can move to the right independently of the spool 67 to connect the outlet port 17 to tank 74 should the need arise. The spool 62, constituting second spool means, may also be split into two separate spools which can be advantageous for manufacturing, cost, and assembly reasons. The spools 62 and 63 are biased in one direction of movement by respective springs 68 and 69. The end chambers 71 and 72 in which the springs 68 and 69 are mounted have outlet ports 73 connected to tank 74. The overall housing 75 in which the various spools are mounted has an inlet port 14 and outlet port 17, with the bores 64 and 65 being interconnected by a passageway 76, and the bores 64 and counterbores 66 interconnected by a passageway 77.

The spool 62 is provided with three lands 78, 79 and 81 with the land 79 being provided with a series of peripheral notches 82. The spool 63 is provided with two lands 83 and 84 with the land 83 having a series of peripheral notches 85. Finally, the spool 67 is provided with two lands 86 and 87 with the land 86 provided with a series of peripheral notches 88. Thus the first spool means constituted by the spools 63 and 67 is in effect stepped by way of the two separate spools being of different diameter, with a first surface against which inlet pressure can act being provided by a combination of the annular land 84 on the spool 63 and the left-hand end of the spool 63, which together add up to the cross-sectional area of the bore 65, and a second surface against which inlet pressure can act being provided by the end of the land 87 on the spool 67 which equates to the cross-sectional area of the bore 66.

Figure 8:
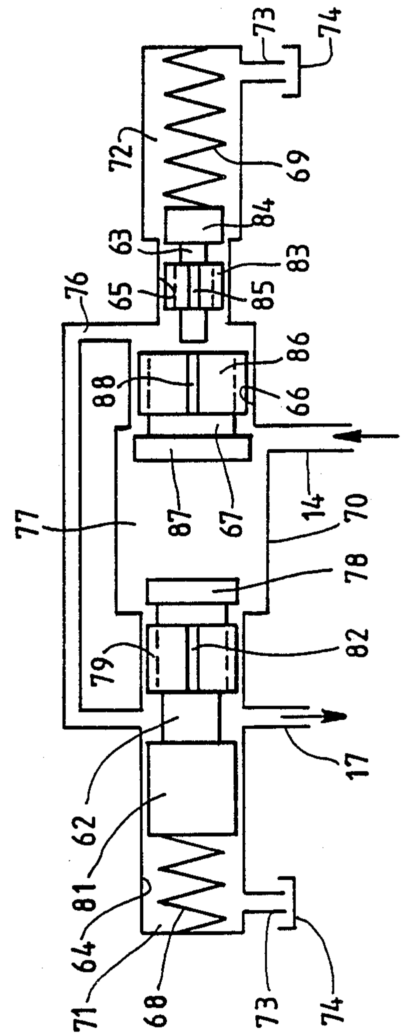
FIG. 8 is a diagrammatic view of another embodiment of the invention.

At zero or low inlet pressures, the inlet port 14 and outlet port 17 are interconnected via two alternative routes, ie. via the spool 67, the passageway 77 and the notches 82 in the spool 62, and the notches 88 in the spool 67, the passageway 76 and the spool 62. In this mode of operation, the spool 63 is biased by the spring 69 to a position in which the land 84 blocks any connection between the passageway 76 and the spring chamber 72, and hence tank 74. In the alternative embodiment shown in FIG. 8, the first spool 63 and second spool 67 are arranged to slide along a common axis.

In operation, the spring preloads are set such that when the inlet pressure rises, the second spool 62 will start to move to the right as seen in FIG. 1 in preference to spool 63 and the land 78 on the spool 62 will move to a position which disconnects the outlet port 17 from the passageway 77 via the notches 82. This movement does not have any effect on the state of the latch as it does not change the pressure at the outlet port 17 because the spool 67 will still allow interconnection between the inlet port 14 and the outlet port 17 via the passageway 76 and notches 88. When the inlet pressure reaches the value at which the device is arranged to latch, the spool 63 of the first spool means will be moved to the right against the action of its spring 69 by way of the inlet pressure acting only on the first surface as defined above (the cross-sectional area of the bore 65) as the spool 67 is free to float and is thus in balance with respect to the inlet pressure at this stage. This movement of the spool 63 connects the passageway 76 to tank 74 via the notches 85 in the land 83 of spool 63. This reduction in pressure in the passageway 76 will cause the spool 67 to become unbalanced and some additional force due to the pressure at the inlet port 14 acting on the second surface provided by the land 87 will move the spools 63 and 67 further to the right which will increase the connection between the passageway 76 and tank 74 until the lands 78 and 87 on the spools 62 and 67, respectively, seal or block any connection between the inlet and outlet ports 14 and 17 via the passageway 77. Thus the device is maintained in the latched state and the sealing land 87 serves to allow inlet pressure to act on only the greater of the first and second surfaces, namely the end of the spool 67. The pressure at the outlet ports 17 will thus reduce to tank pressure and the force on the spring 69 will increase due to the difference in cross-sectional area between the spools 63 and 67. This differential in area should be arranged to be such that the spools 63 and 67 will not move in the opposite direction and reconnect the passageway 76 to the inlet port 14 at any inlet pressure between the latch and unlatch pressures.

When the inlet pressure reduces to the unlatch pressure, the spool 62 first moves to the left so that the land 78 now no longer seals the bore 64 from the passageway 77 and thus the inlet pressure is seen at the outlet port 17 via the notches 82 in the land 79. At the same time, the inlet pressure is seen in the passageway 76, thus eliminating the differential pressure acting on the spool 67. The spring 69 is then able to move the associated spool 63 to the left, together with spool 67, to their original positions in the unlatched mode or state of the device. Thus it is seen that the outlet pressure is equal to the inlet pressure in the unlatched mode of the device and is tank pressure in the latched mode. In this embodiment the additional force to achieve the fully latched mode is provided by the inlet pressure, acting on the spool 67 to urge the latter into engagement with the spool 63 so as to augment the force acting on the spool 63 and place the device in the fully latched mode. FIG. 2 of the drawings shows outlet pressure against inlet pressure for the embodiment of FIG. 1 from which it will be seen that the outlet pressure is low when the device is latched, and high when the device in unlatched.

Turning now to FIG. 3 of the drawings, this illustrates an alternative embodiment comprising a housing 30 having two bores 31 and 32 again arranged parallel to each other, with the bore 32 having a reduced diameter bore 33 at one end thereof. Second spool means by way of a spool 34 is slidably mounted within the bore 31 and is urged in one direction of movement by a compression spring 35 which acts between one end of the spool and an end of the bore 31. Similarly, first spool means by way of a spool 36 is slidably mounted in the bore 32 and is urged in one direction of movement by a compression spring 37 which acts between one end of the spool and the end of the bore 32. The other end of the spool 36 is of reduced diameter (as indicated at 38) so as to be slidable in the reduced diameter bore 33. Thus the spool 36 is stepped to provide first and second surfaces against which inlet pressure can act by way of the difference in cross-sectional area of the bores 32 and 33, and the cross-sectional area of the bore 32, the latter being greater than the former, respectively.

The springs 35 and 37 are essentially contained within end chambers 41 and 42, each of which is provided with a port 43 communicating with a tank 44. A port 46 in the bore 33 communicates, via a passageway 47, with a basic outlet port 48 provided generally mid-way along the bore 31 in which the spool 34 is slidably mounted. The basic outlet port 48 communicates with the overall outlet port 17 of the latch device, and the inlet port 14 of the device is provided between the bore 32 and counterbore 33 and connects to the bore 31 at the opposite end to the spring chamber 41. A passageway 49 provides, in relation to the bore 32, metering edges 20 and 21 of which fulfil a function to be described, and connects to the bore 31 adjacent the basic outlet port 48. The spool 36 is provided with three lands 50, 51 and 52 with the land 50 being provided with a series of peripheral notches 53 and the land 52 with a series of peripheral notches 54. The spool 34 is also provided with three lands 55, 56 and 57 with only the land 57 having a series of peripheral notches 58.

In operation pressure to the reduced diameter portion 38 of the spool 36 is routed via the second switching spool 34, the diameter ratio of the spool 36 as between the reduced diameter portion 38 and the remainder being selected to provide the maximum desired hysteresis effect whilst the spool 34 provides an adjustable unlatch pressure within the hysteresis band defined by the spool 36. More specifically, with zero inlet pressure at the inlet port 14, the reduced diameter portion 38 of the spool 36 is connected to tank 44 via the metering edge 59, the notches 58 in the land 57 and the end chamber 41.

As the inlet pressure rises, the spool 34 first moves to the right as seen in FIG. 3 to the switching position and at this point connects the passageway 49 to the outlet port 17 by virtue of the fact that the land 56 on the spool 34 opens the metering edge 60 and closes the metering edge 59. However, because the passageway 49 is still at tank pressure by virtue of the connection via the metering edge 21, the notches 54 and the end chamber 42, no pressure change occurs at the outlet port 17, i.e this movement of the spool 34 has no effect on the latch. However, upon a further increase in inlet pressure, the spool 36 then moves to the right to its switching position and thus disconnects the passageway 49 from tank 44 and connects it to the inlet pressure. Due to the connection 47 between the outlet port 17 and the bore 33, the reduced diameter portion 38 of the spool 36 is also subject to the change at the outlet port 17 from tank pressure to inlet pressure. Accordingly, the spool 36 moves still further to the right against the action of the spring 39 so as to place the device in the fully latched position in which it is maintained by way of the inlet pressure acting on the second surface, i.e. across the full diameter of the spool 36.

Figure 4:
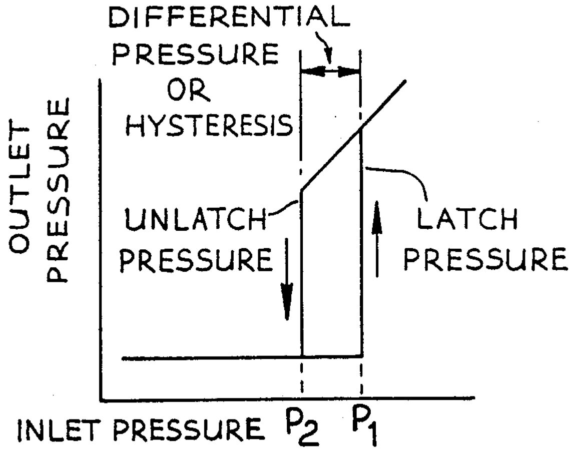
FIG. 4 is a graph illustrating the operation of the embodiment of FIG. 3, FIGS. 5 and 6 are alternative and more detailed arrangements of the embodiment shown diagrammatically in FIG. 1.

The load in the spring 35 is adjusted such that the spool 36 will remain latched when the inlet pressure is reduced until the spool 34 has moved to the left as seen in FIG. 3 to an extent such that it reaches its switching position whereupon the outlet port 17 is reconnected to tank 44 via the metering edge 59, the notches 58 on the land 57 and the end chamber 41. At the same time, the smaller diameter portion 38 of the spool 36 is also connected to tank via the metering edge 59, the notches 58 and the end chamber 41 so as to unlatch the device. The graph of FIG. 4 applies to the embodiment of FIG. 3 from which it will be seen that the outlet pressure is high when the device is in the latched state, and low when in the unlatched state.

Figure 5:
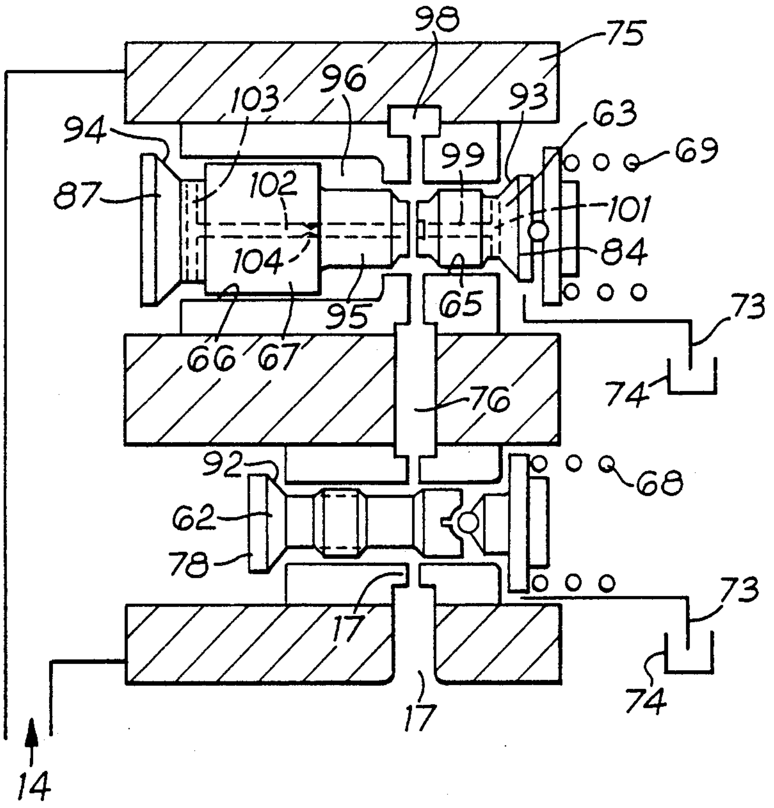

The embodiments of the present invention thus far described have by way of reference to diagrammatic illustrations thereof but FIG. 5 of the drawings illustrates a practical implementation of the embodiment of FIG. 1. Similar reference numerals are used as are employed in FIG. 1 and the operation of the FIG. 5 embodiment is generally the same as that described in connection with FIG. 1. However, it should be noted that the sealing land 78 and the sealing land 87 of the spools 62 and 67, respectively, are provided with respective conical surfaces 92 and 94 which are engageable with associated seats so as to help reduce leakage from the inlet port 14 when the device is in the latch mode. It will also be seen that the spool 67 has a portion 95 of reduced diameter (i.e. the spool is stepped) so as to provide a valve chamber 96 in conjunction with a correspondingly stepped bore 65. This valve chamber 96 helps to damp the movement of the spool 67 to and from the latch and unlatch positions, thus reducing the rate of change of the pressure at the outlet port 17. Leakage into and out of the valve chamber 96 occurs past the reduced diameter portion 95 of the spool 67, the clearance between the reduced diameter portion 95 and the bore 65 being chosen to give the degree of damping required. The outlet port 17 may optionally be connected to the passageway 76, the valve chamber 96 or an annulus 98 to modify the rate of change of pressure at the outlet port 17 when the device switches from one mode to the other. Additional orifices may be employed at the outlet port 17 to reduce the rate of pressure change.

It will be seen that the spools 63 and 67 are provided with internal drillings, as opposed to the peripheral notches 85 associated with the land 83 of the spool 63 in the FIG. 1 embodiment. More specifically, the spool 63 is provided with an axial drilling or passageway 99 which connects the inner end of the spool to a diametral drilling 101 intermediate the ends of the spool. As regards spool 67, an axial drilling 102 connects the inner end of the spool to a diametral drilling 103 intermediate the ends of that spool. The drilling 102 is provided with a restricter 104.

Figure 6:
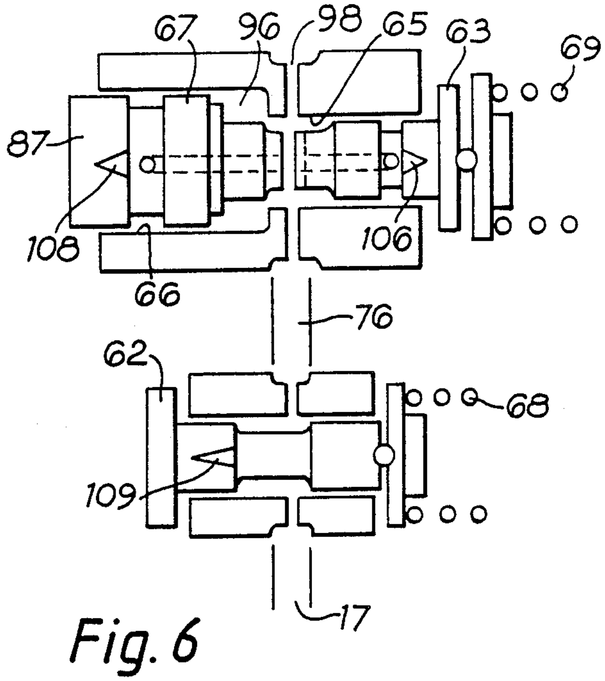

Instead of metering on the conical surfaces 92, 93 and 94 of the spools 62, 63 and 67 in the FIG. 5 embodiment, metering could be effected by notches 106, 108 and 109 provided on the spools 63, 67 and 62, respectively, as shown in FIG. 6 of the drawings. This arrangement reduces the transient flow rate as the device switches from one mode to the other. This also helps to reduce shocks from the high rate of pressure change at the outlet 17. In addition, the spool 67 is forced to make a greater total movement between the latch and unlatch modes which increases the damping effect obtained from the valve chamber 96.

Figure 7:
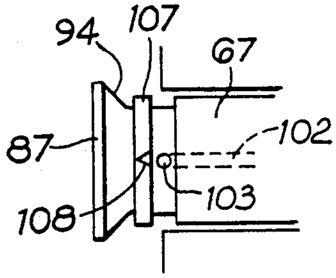
FIG. 7 is a partial view of an alternative component for the arrangement of FIG. 5.

FIG. 7 shows a modification to the spool 67 of the FIG. 5 embodiment in which an additional land 107 is provided between the diametral drilling 103 and the conical surface 94 to allow the spool 67 to travel further between the latched and unlatched states so as to enhance the damping provided by the chamber 96. This modification could include the notches 108 of the FIG. 6 embodiment so as to reduce transient shocks.

The first and second spool means of each embodiment illustrated may be arranged to slide along a common axis instead of separate axes as shown in broken lines in FIG. 1.

It will be seen that the present invention affords an hydraulic latch device which in response to a predetermined inlet pressure will latch and will not unlatch or release until the inlet pressure has reduced to another predetermined, but lower, pressure. The latch and unlatch pressures can be set by independently adjusting the preloads of resilient means (such as springs) to provide an hydraulic latch with adjustable differential pressure or hysteresis. In this respect, the function of the hydraulic latch according to the present invention is comparable to that of a Schmitt trigger. The invention finds particular application in accumulator control circuits and pump unloading circuits but is not restricted thereto. It will be appreciated that additional switching functions can be added to any spool to provide additional inlet and outlet ports. The adjustment of the differential pressure or hysteresis characteristics of a given hydraulic latch device in accordance with the present invention can be made at the factory or be such as to be adjustable in the field by the user of the device.

I claim:

1. An hydraulic latch device comprising a housing having an inlet for hydraulic fluid, an outlet for hydraulic fluid, and first and second spool means slidably mounted in the housing and operable to control the flow of hydraulic fluid from the inlet to the outlet, each of the first and second spool means having resilient means associated therewith and being operable to bias the spool means in one direction of sliding movement, the resilient means being arranged such that that associated with the first spool means determines the inlet pressure which places the device in a latched mode in which a first relationship is established between the inlet and outlet, and the resilient means associated with the second spool means determines the inlet pressure at which the device is placed in the unlatched mode in which mode a second relationship is established between the inlet and the outlet, with the latch pressure being higher than the unlatched pressure, and means provided to assist in maintaining the device in the latch mode by way of the first spool means being stepped so as to provide first and second surfaces against which the inlet pressure can act, the surface area to which the inlet pressure is applied in the latched mode being greater than that to which the inlet pressure is applied in the unlatched mode.

2. A device according to claim 1, wherein said first relationship between the inlet and outlet is an hydraulic connection therebetween, and the second relationship is an hydraulic disconnection therebetween.

3. A device according to claim 1, wherein said first relationship between the inlet and outlet is an hydraulic disconnection therebetween, and the second relationship is an hydraulic connection therebetween.

4. A device according to claim 1, wherein the first and second spool means are arranged to slide along a common axis.

5. A device according to claim 1, wherein the first and second spool means are arranged to slide along different axes.

6. A device according to claim 1, wherein the first and second spool means are each provided with sealing means to prevent leakage from the inlet when the device is in the latched mode.

7. A device according to claim 1, wherein the first and second spool means are each provided with at least one metering notch to reduce hydraulic shocks when the device is switched from the unlatched mode to the latched mode and vice versa.

8. A device according to claim 1, wherein the stepped portion of the first spool means is arranged to cooperate with a correspondingly stepped portion of the bore in which it is slidable so as to create a volume therebetween operable to provide damped sliding movement of the first spool means.

9. A device according to claim 8, wherein the first spool means is provided with an additional land to enhance the damping of the first spool means by increasing the travel necessary between latched and unlatched states.

10. A device according to claim 1, wherein the first spool means is in the form of a plurality of separate spools.

11. A device according to claim 1, wherein the second spool means is in the form of a plurality of separate spools.

12. A device according to claim 1, wherein the first spool means is provided with a land operable in a sealing position to separate said first and second surfaces such that the inlet pressure acts on only one of said surfaces.

13. A device according to claim 1, wherein the first and/or second surface is a composite surface provided by the algebraic summation of two surfaces.

* * * * *